N. M. OESCH.
TEAPOT AND DETACHABLE SPOUT THEREFOR.
APPLICATION FILED APR. 30, 1917.
1,255,779.
Patented Feb. 5, 1918.
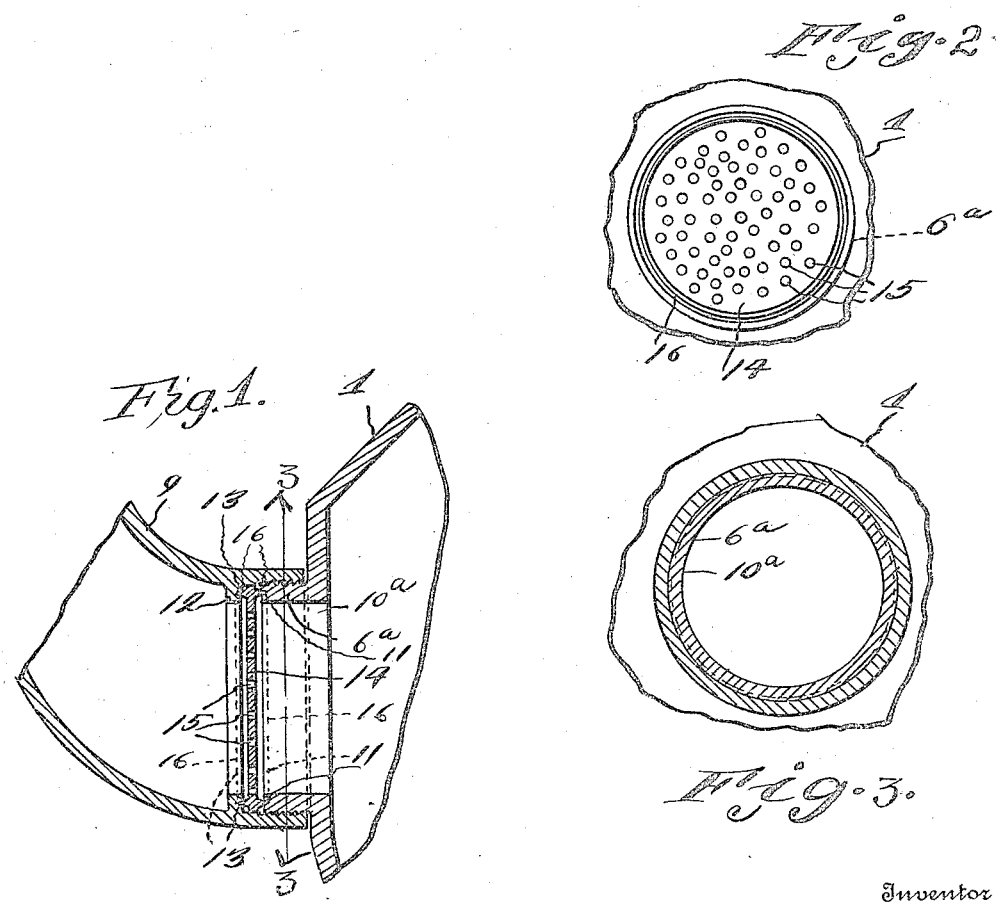

UNITED STATES PATENT OFFICE.

NINA MAY OESCH, OF WOODBURN, INDIANA.

TEAPOT AND DETACHABLE SPOUT THEREFOR.

1,255,779.  Specification of Letters Patent. Patented Feb. 5, 1918.

Application filed April 30, 1917. Serial No. 165,565.

*To all whom it may concern:*

Be it known that I, NINA MAY OESCH, a citizen of the United States, residing at Woodburn, in the county of Allen, State of Indiana, have invented a new and useful Teapot and Detachable Spout Therefor; and I do hereby declare the following to be a full, clear, and exact description of the invention, such as will enable others skilled in the art to which it appertains to make and use the same.

This invention relates to a teapot and an improved detachable spout therefor, and an object of the invention is the provision of means for detachably connecting a spout to the body of a teapot, whereby the spout may be easily removed for cleaning its interior.

A further object of the invention is to provide a removable or detachable strainer plate for the nipple, and to provide means, whereby a ground joint may be attained between the strainer, the nipple and said spout.

In practical fields, the details of construction may necessitate alterations falling within the scope of what is claimed.

The invention comprises further features and combination of parts, as hereinafter set forth, shown in the drawings and claimed.

In the drawings:—

Figure 1 is an enlarged detail sectional view showing how the spout is detachably connected to the body of the teapot and illustrating the perforated strainer arranged between a flange of the spout and the nipple.

Fig. 2 is an end view of the nipple, showing the spout removed, and the strainer in elevation.

Fig. 3 is a sectional view on line 3—3 of Fig. 1.

Referring more especially to the drawings, 1 designates the body of a tea or coffee pot or the like, which may be any suitable size and shape.

The body is provided with a nipple $6^a$ which is open ended, in fact, the nipple is substantially an annular flange, which projects from the marginal edge of the outlet opening $10^a$ of the body of the tea or coffee pot or the like. The marginal edge of the flange or nipple $6^a$ has an annular groove 11 V-shaped in cross section. The spout 9 has its internal threaded end (which is threaded to the flange or nipple $6^a$) provided with an interior annular flange 12 having a V-shaped annular groove 13 in one face thereof. This groove is the same diameter of and concentric with the groove 11 of the marginal edge of the nipple or flange $6^a$. Interposed between the marginal edge of the flange or nipple $6^a$ and the flange 12 is the strainer disk or plate 14 provided with perforations 15, whereby the tea, coffee or the like may be thoroughly strained during its passage through the spout. Upon opposite faces of the disk or plate 14 and adjacent its marginal edge, are annular ribs 16 V-shaped in cross section engaging the grooves 11 and 13, respectively, so that when the spout is screwed home, ground joints between the parts $6^a$, 12 and the disk or plate 14 are insured, thereby preventing leakage. As will be observed, the spout 9 may be removed and cleaned on its interior, and when removed, the disk or plate 14 is also removed, whereby the interior wall of the nipple or flange $6^a$ may be thoroughly cleaned.

The invention having been set forth, what is claimed as new and useful, is:—

In combination, a cooking receptacle comprising a hollow body having an outlet opening, said body having an annular flange extending from and adjacent the marginal edge of the outlet opening, the marginal edge of said flange having an annular groove V-shaped in cross section, an outlet spout threaded to the flange, the inner circumference of the spout having an annular flange provided on one face with an annular groove V-shaped in cross section opposite and concentric with the first groove, and a perforated strainer plate having on its opposite faces annular ribs V-shaped in cross section engaging said grooves respectively, whereby, upon screwing the spout home, tight joints between the strainer and the said flanges are insured.

In testimony whereof I have signed my name to this specification in the presence of two subscribing witnesses.

MRS. NINA MAY OESCH.

Witnesses:
 PRUDENCE A. YAGGY,
 EDNA L. AUGSPURGER.

Copies of this patent may be obtained for five cents each, by addressing the "Commissioner of Patents, Washington, D. C."